Patented Apr. 8, 1924.

1,489,525

UNITED STATES PATENT OFFICE.

VICTOR MORITZ GOLDSCHMIDT, OF CHRISTIANIA, NORWAY.

MANUFACTURE OF MAGNESIUM CHLORIDE.

No Drawing.     Application filed March 3, 1921.   Serial No. 449,362.

*To all whom it may concern:*

Be it known that I, VICTOR MORITZ GOLDSCHMIDT, a subject of the King of Norway, residing at Christiania, Norway, have invented certain new and useful Improvements in the Manufacture of Magnesium Chloride; and I do hereby declare the following to be a full, clear, and exact description of the invention, such as will enable others skilled in the art to which it appertains to make and use the same.

This invention relates to the manufacture of magnesium chloride in anhydrous or substantially anhydrous condition by reacting upon oxygeniferous magnesium compounds with chlorine or chlorine compounds.

It is known that magnesium chloride is formed by the direct action of chlorine upon magnesium oxide according to the equation—

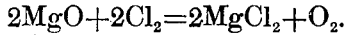

To make use of this reaction on a commercial scale has been found to be impracticable, however, because suitable conditions of equilibrium are attainable only at so low temperatures (below about 500° C.) that the reaction velocity is insufficient for manufacturing purposes.

For these reasons other methods have been suggested based upon the use besides chlorine of reducing agents such as coal, gaseous carbon compounds, carbon in chemical combination with chlorine, metal sulphides and other substances which combine with the oxygen liberated by the reaction and thereby allow of carrying the reaction into effect at temperatures at which the reaction velocity is sufficiently high, the reducing agent taking up the oxygen in proportion as it is liberated according to the above equation.

In these known processes, however, serious difficulties are encountered with. Thus it is no easy task to construct an apparatus which at high temperatures (usually suggested to be between 700° and 800° C. or more) afford sufficient resistance against the reacting substances and on the other hand the resulting magnesium chloride has to be separated from other metal chlorides simultaneously formed for which purpose expensive separation processes have to be resorted to. In addition when temperatures above the melting point of magnesium chloride is made use of the magnesium chloride will form a hindrance to a complete chlorination because the initial materials will become impregnated with fused magnesium chloride already in the first stage of the chlorination operation.

According to the present invention these difficulties are avoided by carrying the chlorination into effect at temperatures at which the magnesium compounds constituting the raw material and the product are in substantially or wholly solid condition, and this is made possible by effecting the chlorination in the presence of volatile sulphur which is not chemically combined with oxygen and in the absence of substances capable of forming water. The sulphur may be present either in an elementary condition or in the form of volatile non-oxygeniferous compounds of sulphur such as sulphur chloride or sulphur bichloride either alone or together with elementary sulphur. The reaction taking place may then be illustrated by the equation:

or by other analogous reactions in which the sulphur enters in the form of $S_2$ or $S_8$ or as intermediary formed compounds of chlorine with sulphur such as for example $S_2Cl_2$ or $SCl_2$ in that the formation of sulphur-chlorine compound with certainty precedes the chlorination of the oxygeniferous magnesium compounds for example according to the equation:

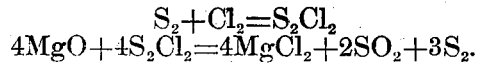

Although sulphur monochloride $S_2Cl_2$ has been known as a means for the chlorination of certain metal oxides it has not hitherto been made use of as a chlorination means for oxygeniferous magnesium compounds and it was not possible to foresee that the action of chlorine upon magnesium oxygen compounds would take place at so low temperatures and at such a high velocity when sulphur is present that the reaction could be utilized in the production of magnesium chloride on a commercial scale. On the contrary this was a very surprising discovery.

In carrying the present invention into effect the treated oxygeniferous magnesium compounds may consist of the oxide or the carbonate or calcium-magnesium carbonate or silicate but for manufacturing purposes magnesium oxide has been found to be the most suitable raw material.

I have found that in the presence of sulphur or non-oxygeniferous compounds of sulphur and chlorine the chlorination of magnesium oxide and other magnesium compounds takes place with a considerable velocity at temperatures at which the chlorination of oxygeniferous magnesium compounds has not hitherto been practicable, thus for instance at 250° C. At 350°–450° C. this chlorination takes place with a sufficiently high velocity to allow of carrying the process into effect on a manufacturing scale.

There is, however, nothing to prevent the process from being carried into effect also at temperatures above 450° C. or above 500° C. when it is considered desirable from a manufacturing point of view for example to fuse the magnesium chloride for instance for the electrolytical production of magnesium in that the process is particularly well adapted to be combined with the electrolytical manufacture of magnesium and chlorine.

In case the process is carried into effect at low temperatures for example about 300° C. a small proportion of magnesium sulphate will also be formed in addition to the magnesium chloride for instance according to the equation.

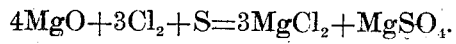
$$4MgO + 3Cl_2 + S = 3MgCl_2 + MgSO_4.$$

In this case the magnesium chloride obtained by the process will contain a proportion of magnesium sulphate. This percentage of magnesium sulphate may for example be removed by the known method of smelting with carbon, the magnesium sulphate reacting at high temperatures with carbon according to the equation

$$MgSO_4 + C = MgO + SO_2 + CO.$$

Small proportions of magnesium oxide formed by this treatment may easily be separated from the easily fusible magnesium chloride. For the purpose of this subsequent decomposition of the by-product, magnesium sulphate, it is suitable to add a small proportion of carbon (coal or coke) to the magnesium oxide to be chlorinated before it is subjected to the chlorination operation.

When the chlorination is effected at temperatures about or above 500° C. (for example between 450 and 550) the proportion of magnesium sulphate formed by the secondary reactions will be quite insignificant, and from this reason it may sometimes be found desirable to carry the reaction into effect at such high temperatures.

It is, however, in every instance necessary in order to obtain a useful result that the chlorination is effected below the melting point of anhydrous magnesium chloride because it strongly impedes the completion of the reaction that the raw materials become impregnated with molten magnesium chloride.

In case it is desired to utilize the reaction heat to fuse the resulting magnesium chloride, this should therefore take place only in the final stages of the chlorination. Consequently the top temperature limit for the suitable execution of the present process will be about 700° C. Even this temperature is however lower than those, which have been suggested in connection with prior chlorination processes.

As a consequence of the fact, that the present process can be carried into effect at very much lower temperatures than the prior processes for the chlorination of magnesium oxygen compounds in the absence of water in a free or combined state the problem of apparatus construction becomes so very much simplified, that any competent engineer will be able to construct the required apparatus in accordance with known principles.

Any type of apparatus suitable for reacting upon solids with gases may be employed for the purpose of the present invention. Thus the reaction chamber may be stationary or it may be arranged so as to be able of being maintained in motion during the reaction period for example by being revoluble or the reaction chamber may be provided with stirring or agitating means of any suitable construction.

Or the reaction may for example be carried out according to the counter current principle in a cylindrical vessel into which the magnesium oxygen compounds and the sulphur is supplied from above in a cold or preheated condition while chlorine in a liquid state or as a cold or heated gas is introduced from below it may be either in a pure condition or mixed with gases which do not themselves partake in the reaction. The conditions may be so controlled that the reaction will then take place at the point where the materials introduced at the top meet with the substances supplied from below, and preferably in the lower part of the cylinder, while in the upper part of the cylinder which may be cooled by suitable means a partial condensation of the volatile substances partaking in the reaction will be effected. It may be suitable to combine such an apparatus as the above described cylinder directly with the electrolytic cell for the production of magnesium, so that chlorine in a hot condition is introduced into the cylinder from the electrolytic cell, while magnesium chloride it may be after a preceding fusion is introduced into the electrolytic cell. As a matter of course, however, the present invention is not however limited to any of the above described details in the process and apparatus for carrying the invention into effect.

The heat produced by the reaction is sufficient to maintain the reaction even when comparatively small apparatuses are made use of, and will also be sufficient to effect complete or partial fusion of the resulting magnesium chloride if this is desired, but such fusion cannot, however, be effected before the last stages in the chlorination have been reached. The temperature in the reaction zone may be controlled as desired by regulating the velocity with which the charging of the raw materials take place or by altering the proportion of the materials. The gaseous or vapour-formed substances, which escape from the re-action space and which besides sulphur dioxide may consist of compounds of sulphur and chlorine and it may be also oxygeniferous sulphurchlorine compounds as well as sulphur vapour or chlorine are suitably brought to partial condensation. This may be effected for example in a condensation zone in the upper part of a cylindrical vessel, the lower part of which constitutes the reaction space and the condensation may suitably be effected in such a manner, that sulphur, combinations of sulphur and chlorine and it may be also oxygeniferous sulphur-chlorine compounds in a liquid or vapour-formed condition flows downward to the reaction space, while sulphur dioxide and it may be free chlorine is either let out into the atmosphere or subjected to separation, recovery or further treatment by known means. It is suitable, however, to control the reaction course and the condensation so as not to allow, free chlorine to escape from the reaction zone and the condensation zone thereabove. This may be brought about by limiting the supply of chlorine.

When such oxygeniferous magnesium compounds are used, which produce gases during the reaction in other ways than above described for example magnesium sulphate which will produce sulphur dioxide or magnesium bearing carbonates which will give off carbon dioxide, the reaction as well as the condensation is effected in such a manner, that the said gases leave the reaction chamber in the gaseous state.

As regards the most efficient execution of the present process on a manufacturing scale experiments have proved that amongst the several anhydrous oxygeniferous magnesium compounds available the magnesium oxide is the most suitable material because by the use of this material the reaction takes place with the lowest temperatures and with the greatest velocity. This material may for example be employed in the form of the usual commercial "light magnesia" or "heavy magnesia" or in the form of the caustic calcined magnesite with grains having a size of for example 0.1–0.5 mm.

When the process is effected in a continuous manner the proportion of sulphur and magnesia may be for example about 40 parts by weight of magnesia to about 16 parts by weight of sulphur but it may be necessary to depart from these proportions depending upon the reaction temperature and the type of apparatus employed because on the one hand some sulphur may be combined in the form of sulphate instead of as sulphur dioxide while on the other hand some sulphur may get lost as a consequence of gaseous oxygen having access to the apparatus. The magnesium oxide employed may suitably be mixed with a small proportion of carbon for example in the form of charcoal for example in a proportion corresponding to 1–3 per cent by weight of the magnesium oxide, this carbon acting to decompose the magnesium sulphate which may be formed besides the magnesium chloride. The proportion of chlorine which is supplied in continuous working and which corresponds to 40 parts by weight of magnesium oxide may be between 53 and 71 parts by weight of chlorine.

All of the substances employed in the reaction when not originally in an anhydrous condition should be subjected to careful drying before being introduced into the reaction chamber, if it is desired to produce entirely anhydrous magnesium chloride. When the reaction is carried into effect with the substances referred to in the above example and according to the counter current principle then it is suitable to cause the reaction to commence at about 200°–300° C. and then to effect the chlorination of the bulk of the charge in the temperature interval between 300° C. and 600° C. and finally under the last stage of the reaction to wholly or partially melt the product by heating to somewhat above 700° C. As a matter of course the invention is not limited to the use of any of the above temperature values in the various stages of the process.

I claim:

1. Process of producing magnesium chloride in which a material comprising an oxygeniferous magnesium compound is subjected to chlorination in the presence of volatile sulphur which is not in chemical combination with oxygen, at a temperature between 200° and 700° C., at which the resulting magnesium chloride is in a substantially solid condition.

2. Process according to claim 1 in which the chlorination takes place in the presence of elemental sulphur.

3. Process of producing magnesium chloride in which a material comprising oxygeniferous magnesium compounds is subjected to chlorination in the presence of volatile sulphur which is not chemically combined with oxygen, and in the absence of substances capable of forming water at a temperature at which the resulting magnesium chloride is in a substantially solid condition, temperatures of between 450° C. and 550° C. being maintained during the substantial part of the chlorination operation.

4. Process of producing magnesium chloride in which a material comprising oxygeniferous magnesium compounds is subjected to chlorination in the presence of volatile sulphur which is not chemically combined with oxygen, and in the absence of substances capable of forming water at a temperature at which the resulting magnesium chloride is in a substantially solid condition, the chlorination at a low temperature being combined with a finishing chlorination treatment at a temperature at which fusion of the resulting magnesium chloride is effected.

5. Process of producing magnesium chloride according to claim 1, in which the chlorination is carried into effect in the presence of a non-oxygeniferous compound containing sulphur and chlorine.

6. Process according to claim 1 in which the chlorination by means of chlorine is carried into effect in the presence of elementary sulphur and of non-oxygeniferous compounds of sulphur and chlorine.

7. Process of producing a magnesium chloride material poor in magnesium sulphate according to claim 1 in which temperatures of between 450° C. and 550° C. are maintained during the substantial part of the chlorination operation.

8. Process of producing magnesium chloride in which the chlorination at a low temperature according to claim 1 is combined with a finishing chlorination treatment at which fusion of the resulting magnesium chloride is effected.

In testimony that I claim the foregoing as my invention, I have signed my name in presence of two subscribing witnesses.

VICTOR MORITZ GOLDSCHMIDT.

Witnesses:
    MARGARET BRIGGS,
    ELSE WILHAVEN.